(12) United States Patent
Petersson

(10) Patent No.: US 8,356,619 B2
(45) Date of Patent: Jan. 22, 2013

(54) NON RETURN VALVE AND A PROCEEDING TO FORM A NON RETURN VALVE SYSTEM TO BE FASTEN TOGETHER INSIDE A RECEPTACLE INTENDED TO CONTAIN AIR OR LIQUID

(75) Inventor: Bengt Petersson, Vallda (SE)

(73) Assignee: BodyLineair Production AB, Åmål (SE)

( * ) Notice: Subject to any disclaimer, the term of this patent is extended or adjusted under 35 U.S.C. 154(b) by 399 days.

(21) Appl. No.: 12/671,512

(22) PCT Filed: Jul. 29, 2008

(86) PCT No.: PCT/SE2008/050899
§ 371 (c)(1),
(2), (4) Date: Jan. 31, 2010

(87) PCT Pub. No.: WO2009/020425
PCT Pub. Date: Feb. 12, 2009

(65) Prior Publication Data
US 2010/0187463 A1    Jul. 29, 2010

(30) Foreign Application Priority Data
Aug. 3, 2007   (SE) .......................... 0701816

(51) Int. Cl.
*F16K 15/18*   (2006.01)
(52) U.S. Cl. ........ 137/223; 137/843; 137/859; 251/339; 251/349; 251/354; 251/82
(58) Field of Classification Search ............ 251/339, 251/349, 354, 149, 82, 83; 137/223, 225, 137/843, 859
See application file for complete search history.

(56) References Cited

U.S. PATENT DOCUMENTS

| | | | | |
|---|---|---|---|---|
| 1,702,974 A | * | 2/1929 | MacDonald | 137/846 |
| 2,546,709 A | * | 3/1951 | Abarr | 222/213 |
| 2,568,976 A | | 9/1951 | Andrews | |
| 2,700,165 A | * | 1/1955 | Talisman | 5/658 |
| 3,263,903 A | * | 8/1966 | Waller et al. | 383/44 |
| 3,773,233 A | * | 11/1973 | Souza | 222/490 |

(Continued)

OTHER PUBLICATIONS

Swedish Patent Office, Int'l Seacrh Report in PCT/SE2008/050899, Nov. 5, 2008.

(Continued)

*Primary Examiner* — John K Fristoe, Jr.
*Assistant Examiner* — Minh Le
(74) *Attorney, Agent, or Firm* — Potomac Patent Group PLLC

(57) ABSTRACT

The present invention relates to a non-return valve (100) intended to be joined to a container (11) for air or liquids. The non-return valve is formed of non-rigid plastic or rubber material (1, 15), which forms reliable, tight non-return valve function in an opening channel (2) of the non-return valve. The invention is primarily characterized in that a resilient device (5) is arranged in a channel (50) arranged on the side of the opening channel (2) of the non-return valve and that said resilient device (5) extends from one side (52) of the channel (50) to the opposite side (52) of said channel (50). The invention also relates to a method for producing in a common stage the non-return valve together with a container (11) or for joining said non-return valve to a container (11) after the production of the non-return valve.

4 Claims, 2 Drawing Sheets

U.S. PATENT DOCUMENTS

Figure 1:
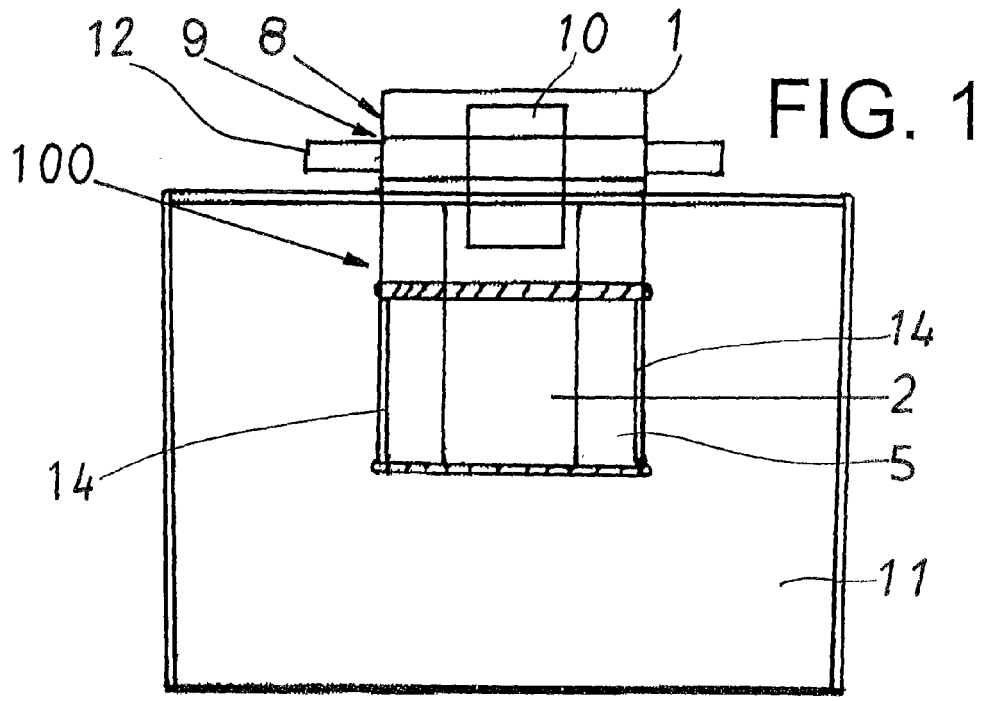

| | | | | |
|---|---|---|---|---|
| 4,240,630 A * | 12/1980 | Hoffman | ............... | 473/610 |
| 4,775,379 A * | 10/1988 | Fogarty et al. | ............... | 623/8 |
| 4,842,007 A * | 6/1989 | Kurtz | ............... | 137/223 |
| 4,850,912 A * | 7/1989 | Koyanagi | ............... | 441/40 |
| 4,983,138 A * | 1/1991 | McGrath | ............... | 446/224 |
| 5,019,101 A * | 5/1991 | Purkait et al. | ............... | 623/8 |
| 5,072,855 A * | 12/1991 | Herzig | ............... | 222/39 |
| 5,188,558 A * | 2/1993 | Barton et al. | ............... | 446/224 |
| 5,308,163 A * | 5/1994 | Abe | ............... | 383/44 |
| 5,529,224 A * | 6/1996 | Chan et al. | ............... | 222/212 |
| 5,595,521 A * | 1/1997 | Becker | ............... | 446/224 |
| 5,830,780 A * | 11/1998 | Dennison et al. | ............... | 428/68 |
| 5,860,441 A * | 1/1999 | Garcia | ............... | 137/15.18 |
| 5,934,310 A * | 8/1999 | Littlehorn | ............... | 137/223 |
| 6,170,513 B1 * | 1/2001 | Lo | ............... | 137/223 |
| 6,247,488 B1 * | 6/2001 | Peterson | ............... | 137/223 |
| 6,418,579 B2 * | 7/2002 | Perez et al. | ............... | 5/713 |
| 6,934,989 B2 * | 8/2005 | Ledvina et al. | ............... | 5/644 |
| 7,048,025 B2 * | 5/2006 | Sperry et al. | ............... | 156/581 |
| 2002/0148507 A1 | 10/2002 | Porter et al. | | |
| 2004/0159350 A1 * | 8/2004 | Lai | ............... | 137/223 |
| 2007/0056647 A1 | 3/2007 | Frayne | | |

OTHER PUBLICATIONS

WIPO, Intl Prelim. Report on Patentability in PCT/SE2008/050899, Feb. 18, 2010.

* cited by examiner

NON RETURN VALVE AND A PROCEEDING TO FORM A NON RETURN VALVE SYSTEM TO BE FASTEN TOGETHER INSIDE A RECEPTACLE INTENDED TO CONTAIN AIR OR LIQUID

The present invention relates to non-return valve systems for air-filled or liquid-filled containers formed of non-rigid plastic or rubber material and which forms non-return valve function for the container, which for instance consists of a mattress, cushion/pillow or a package, for air-filling or liquid-filling and which non-return valve system comprises an opening channel, where filling and discharge can take place, as well as holder device for a discharge pipe.

PRIOR ART AND PROBLEMS

On the market, there are many different kinds of non-return valves. They are all more or less complex. In all cases, the same are difficult to be sufficiently tight. In addition, they do not have sufficiently great opening, which enables quick filling and emptying.

By among others U.S. Pat. No. 3,282,412A, U.S. Pat. No. 5,308,163A and U.S. Pat. No. 5,772,034A, non-return valves are known, which however do not have a resilient device such as is intended according to the present invention, and which has the intended construction and the effect.

U.S. Pat. No. 2,568,976A comprises a flexible valve, which is formed of a rubber spring (4), which is fastened internally in a container on the wall (7) thereof. Said spring (4) is in closed sealed position arranged to assume a curved shape so that the container also is formed with curved shape. Upon insertion of a pin (9) in a valve opening (8) of the container (7), which the valve (1) is fastened on, an emptying channel 8 opens. However, the valve sits internally in the container 7 as well as that the spring is not formed of a resilient plate, which is received in a space of the valve. The known valve has the spring exposed to the contents of the container in contrast to the invention, where the spring is kept separated from the interior of a container. There are also other differences and disadvantages of the known said non-return valve.

Solution and Advantages

A first object of the present invention is to provide production technical advantages and also user advantages, and yet competitive prices as well as improve the quality of the containers by a simple and reliable non-return valve system as well as in addition a holder device for discharge pipe of the valve construction, as well as give possibility of great opening channel for quick filling and emptying.

Said objects are attained according to the present invention, the features of which are seen in subsequent claim 1. The opening channel 2 is formed between two portions 1, 1 of the film material lying against each other. On said portions 1, 1, two weld lines 3 are welded in the longitudinal direction, which form the opening channel 2 between themselves for tapping and tapping off air or liquid. A resilient function arises and which spreads the material in the opening channel towards the sides by applying a plane thin resilient, preferably, plastic sheet material 5, which is fastened in over the long sides of the opening channel in holder 16 formed for the spring 5. This is carried out so that the plastic sheet material 5 becomes deflected outward over the opening channel 2, which spreads the material in the opening channel 2 towards the sides 55, 60 between the sides 51 of the channel 50. The fixing of the resilient plastic material sheet 5, takes place by, e.g., riveting, welding or that it is retained by welding together a portion of film material 15 after the long sides by applying a weld line 14 on each side of said opening channel 2 outside the opening channel 2, so that a holder 16 is formed in the form of a space 50 where the resilient plastic sheet material 5 may be threaded in and form a spring deflected over the width of the opening channel 2, which spring spreads the material towards the sides 55, 60 of the opening channel 2, which then becomes plane with reliable seal.

Figure 2:
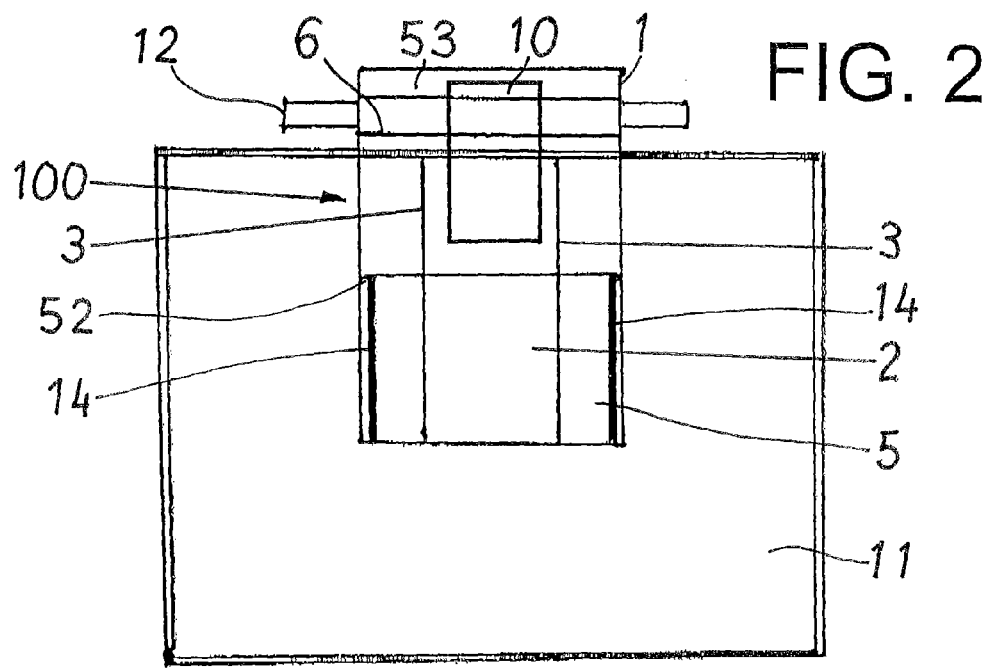
Figure 3:
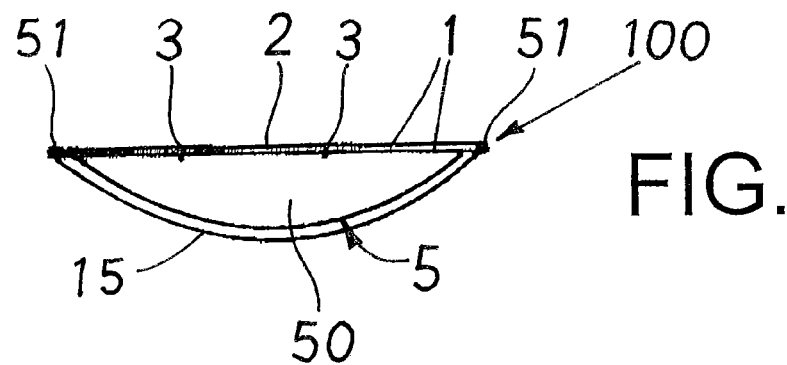
Figure 4:
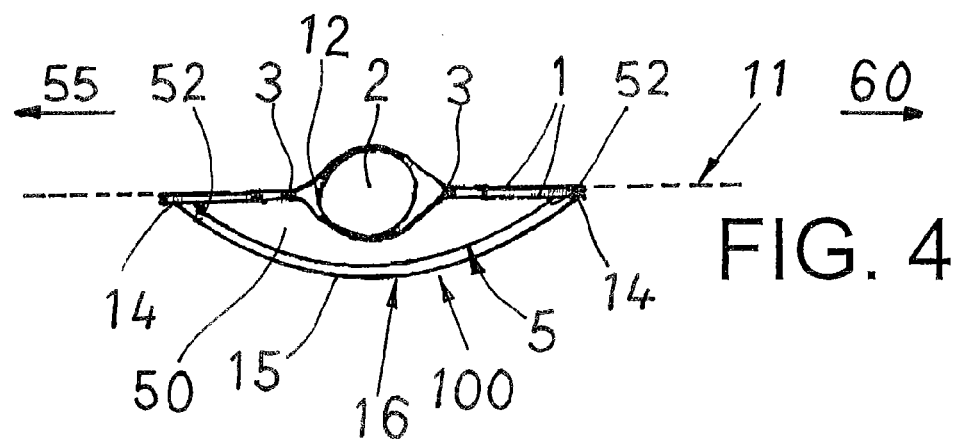
Figure 5:
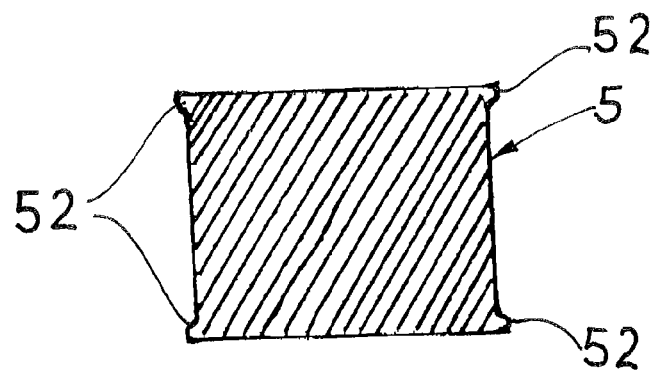

The invention is described below such as a number of preferred embodiment examples, reference being made to the appended drawings, in which FIG. 1 schematically shows a valve device inserted into an intended container, FIG. 2 shows the container having said valve arrangement, FIG. 3 shows the valve separately having the valve arrangement in closed sealed position, FIG. 4 shows the valve arrangement in mounted position on container in opened position for letting out the contents from the container, and FIG. 5 shows a planar view of a spring element for the valve arrangement.

Filling can be effected into the container 11 when the spring function subsides when air or liquid is filled into the container. Upon emptying of the container 11, a discharge pipe 12 is inserted into the opening channel 2 so that the non-return valve function is opened. Upon extraction of the discharge pipe 12, the non-return valve 100 shuts efficiently. The discharge pipe 12 may then be attached into the holder device for the discharge pipe 12 of the valve 9 if desired.

The holder device 9 for the discharge pipe 12 is provided by the fact that one of the portions of the non-return valve, one of the flaps 53, which are formed outside the container after the joining of the non-return valve 100 and the container 11, is folded twice and with a TEFLON® polytetrafluoroethylene film tape 10 in the opening channel 2 and is welded by applying a transverse weld line 6 transversely over the non-return valve 100 so that a transverse channel 9 is formed, which is sufficiently great so that the discharge pipe 12 can be inserted into and be stored therein. This also contributes to the outer opening of the non-return valve 100 being stretched out towards the sides at the replenishment opening and increases the safety so that trash cannot come into the non-return valve. A second portion 53 of the material 1, which forms a part of the non-return valve 100 also constitutes gripping device 8 for use upon filling and emptying of said container 11.

The non-return valve 100 is preferably welded into the container 11 with a shown adapted TEFLON® polytetrafluoroethylene film tape 10 in the opening channel 2 of the non-return valve so that the opening channel 2 is not welded up upon the joining of the valve 100 to the container 11.

The invention is naturally not limited to the embodiments described above and shown in the accompanying drawings. Modifications are feasible, particularly as for the nature of the different parts, or by usage of equivalent technique, without departing from the protection area of the invention, such as it is defined in the claims. For instance, parts may be manufactured in another order than what has been described and been shown above and in the drawings and/or separately and/or jointly.

The invention claimed is:

1. A non-return valve intended to be joined to a container intended for air or liquids, comprising:
   an opening channel in a non-rigid plastic or rubber material forming the non-return valve; and
   a resilient device on a flat outside of the non-return valve in a shape of a thin resilient sheet material, which extends along the opening channel and is fastenedly received in a deflected arch on each side of the opening channel in order to spread the material of the opening channel laterally, wherein the resilient sheet material is fixed under the plastic or rubber material, which is welded along outer sides of the opening channel and which thereby forms a holder for the resilient sheet material, which is arranged to be deflected and threaded in between one of the material of the opening channel and the material of the holder, and the resilient sheet material has projections along side edges facing away from each other for retention.

2. A method of forming a non-return valve having a holding device for a discharge pipe, when the discharge pipe is in the holding device, a material of the non-return valve being extended and flattened and having seals at an opening channel so that trash cannot come into the opening, comprising:

joining two portions of the material, which comprises a plastic or a rubber and which lie planarly against each other, by two weld lines that form the opening channel between themselves;

applying a weld line on each side of the opening channel for joining a third portion of the material to form a holder on one side of the opening channel for applying a device in a form of a thin resilient sheet material in said holder;

folding a portion of the material and applying a weld line transversely over the non-return valve comprising an insert in a shape of a polytetrafluoroethylene film tape in the opening channel, so that the folded portion forms the holding device for the discharge pipe, a second portion of the material forming part of the non-return valve, also constituting a gripping device for use upon filling and emptying of a container;

forming the non-return valve and a container by mutually joining the non-return valve to a the container by a sealing weld and to a polytetrafluoroethylene film tape insert in the opening channel; and removing the polytetrafluoroethylene film tape after which emptying and filling of the container can be effected.

3. A method for forming a non-return valve to be joined to a container for air or liquids, the non-return valve and the container being formed of non-rigid plastic or rubber material and comprising an opening channel and a resilient device to spread the material of the opening channel laterally, comprising:

joining three layers of plastic or rubber material laid together along double weld lines in pairs, which between themselves form the opening channel and a reception channel for receipt of the resilient device which has a form of a sheet of resilient material to be received in the reception channel in order to in deflected shape spread the material of the opening channel laterally to a plane position including sealing against a pipe received inside the opening channel for filling and emptying the container upon opening of the non-return valve.

4. The method of claim 3, wherein the non-return valve is manufactured separately from the container before joining the non-return valve to the container.

\* \* \* \* \*